Oct. 18, 1927.
G. E. NERNEY
1,645,658
EYEGLASS CONSTRUCTION
Filed July 21, 1925
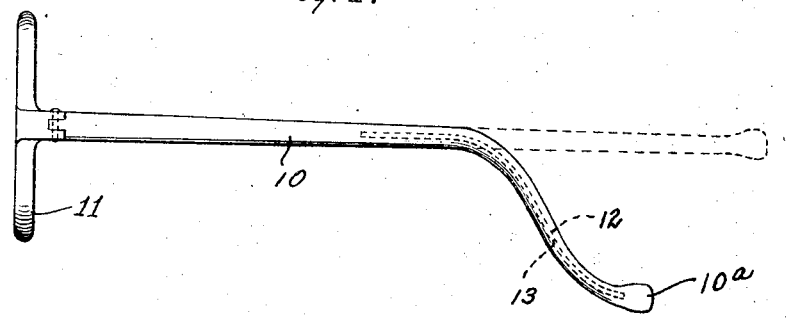
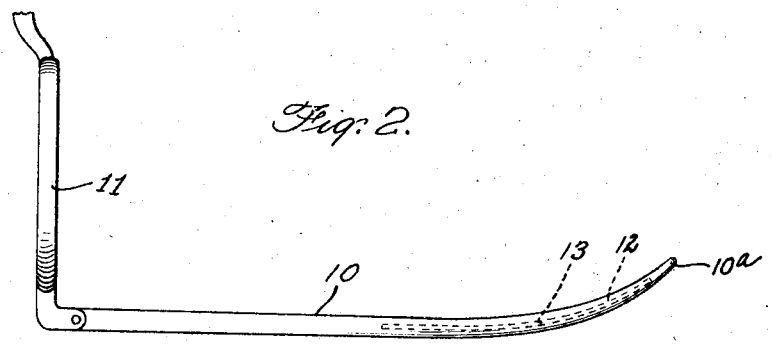
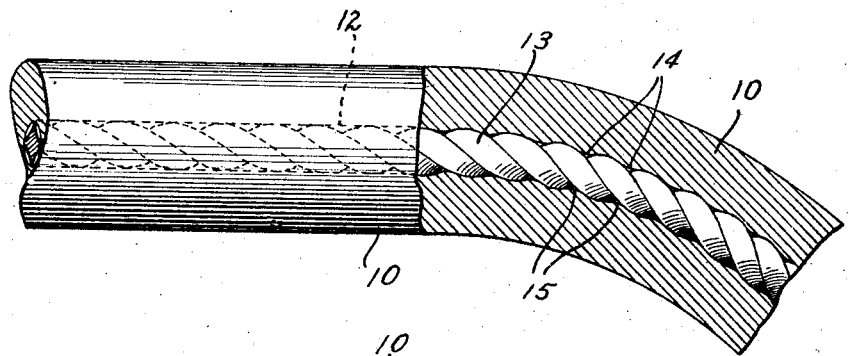
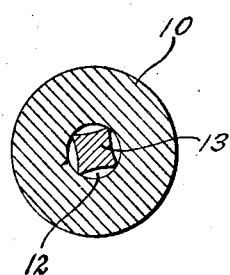

Patented Oct. 18, 1927.

1,645,658

UNITED STATES PATENT OFFICE.

GEORGE E. NERNEY, OF ATTLEBORO, MASSACHUSETTS.

EYEGLASS CONSTRUCTION.

Application filed July 21, 1925. Serial No. 44,962.

This invention relates to eyeglass construction and more particularly to the construction of non-metallic eyeglass temple bars.

One of the objects of the invention is to provide a practical and efficient means of reenforcing a non-metallic temple bar. Another object is to provide a reenforcement capable of dependably holding the curved portion of the non-metallic temple bar against straightening out. Another object is to provide reenforcing means adapted to permit the non-metallic material of the temple bar to be brought to shape readily and without undue distortion or straining thereof when the temple bar is bent to the desired curved contour. Another object is to provide a practical and efficient art of temple bar construction which achieves the above results, is practical, and which may be carried on at low cost. Other objects will be in part obvious or in part pointed out hereinafter.

The invention accordingly consists in the features of construction, combinations of elements, arrangements of parts and in the several steps and relation and order of each of the same to one or more of the others all as will be illustratively described herein, and the scope of the application of which will be indicated in the following claims.

In the accompanying drawing in which is shown one of the various possible embodiments of the mechanical features of this invention, Figure 1 is a side elevation of a temple bar;

Figure 2 is a top plan view;

Figure 3 shows a portion of the temple bar partly in section and greatly enlarged, and Figure 4 is a vertical transverse section through Fig. 3.

Similar reference characters refer to similar parts throughout the several views of the drawing.

Referring now to the drawing in detail, there is shown in Figures 1 and 2 a temple bar 10 connected at its forward end to an eyeglass rim 11. The temple bar 10 is of non-metallic material such as celluloid or other similar materials employed in the manufacture of eyeglass parts. This non-metallic temple bar is of substantial thickness, and of itself is substantially rigid and not easily flexed to any substantial extent.

As shown by the dotted lines in Figures 1 and 2, the temple bar 10 in its process of manufacture is preferably first formed as a straight member. Thereafter it is bent to the desired contour of a temple bar, for example, to the contour shown in full lines in Figures 1 and 2. As stated above, the temple bar is of itself substantially rigid and not readily flexed; but, however, after it has been bent to the desired curved contour and is in use there is a tendency for the temple bar to straighten out and lose the contour originally given thereto. The heat from the head of the wearer and strains placed upon the temple bar in use aid the temple bar in this tendency to thus distort and lose its desired contour. Therefore, in order to strengthen the non-metallic temple bar against such straightening out or distortion, it is reenforced.

After formation of the straight temple bar as indicated in dotted lines in Figures 1 and 2, there is formed therein, preferably by drilling, an axial recess or passage 12 extending from the rear end $10^a$ of the temple bar to a point forward of the portion thereof which is to be curved. Into this recess is inserted endwise a reenforcing member which preferably takes the form of a metal wire 13. The wire member is of such length that its rear end is spaced forwardly of the rear end of the non-metallic temple bar. The opening left at the rear end of the temple bar by the insertion of the wire is closed by suitable means, preferably as disclosed in the co-pending application of Wilbur H. Siddall, Serial No. 44,960 filed July 21, 1925. The straight non-metallic bar member is then softened by suitable means at the portion thereof to be curved, and this portion with the wire reenforcement therein is bent to the desired contour, for example as shown in Figures 1 and 2.

When the non-metallic temple bar is bent to its curved shape, the material thereof on the inside of the curve is compressed and the material thereof on the outside of the curve is stretched. The tendency is for the temple bar at the bend to flatten out and expand laterally so that the circular recess or passage in which the wire 13 is contained tends to become oval in cross-section, the material on the outer and inner sides of the curve moving in together to decrease the diameter of the recess therebetween. If a plain circular wire reenforcement is employed, no provision is made for this action of the non-metallic material, and consequently the material binds on the wire at the inner and outer sides of the curve. Thus the non-metallic material is unduly stressed as the bending occurs and the desired smooth even curve is not easily made.

Considering now more particularly the reenforcing wire 13 herein disclosed, referring to Figures 3 and 4, this wire is seen to be a spirally twisted wire which is preferably polygonal (for example, square) in cross-section. In making this wire, a wire of square or other desired cross-section is gripped at its two ends and twisted to the spiral contour shown. Thus the surface of this wire 13 presents a plurality of grooves extending about the same in spiral fashion.

When the temple bar is bent with the twisted wire 13 therein, as shown in the enlarged view of Figure 3, and the circular recess therein tends to flatten out, the non-metallic material flows into the grooves of the wire, as shown at 14 and 15. The non-metallic temple bar is permitted to bend without any appreciable friction against the metal wire, the material entering the grooves as the temple bar is bent. Moreover, this is true no matter in what direction the temple bar is bent; the grooves are always available at the inner and outer sides of the bend. This is particularly advantageous in a temple bar of the shape shown in Figures 1 and 2 which, it will be seen, is bent in two directions at once in curving downwardly over the ear and inwardly toward the head of the wearer.

In addition to the above, this spirally twisted wire is of advantage when it is being inserted into the recess of the temple bar. The wire is preferably made to have a snug fit in the recess and, on account of the spiral grooving of its surface, the wire may readily be twisted into place if it does not pass in freely.

From the above it will be seen that there is herein provided a temple bar construction and an art which achieve the objects of this invention including many practical and useful advantages.

As many possible embodiments may be made of the mechanical features of the above invention and as the art herein described might be varied in various parts, all without departing from the scope of the invention, it is to be understood that all matter hereinabove set forth or shown in the accompanying drawing is to be interpreted as illustrative and not in a limiting sense.

I claim as my invention:

1. In construction for eyeglass temple bars, in combination, a temple bar member comprising a solid bar of non-metallic material and bent to a curved contour at a portion adjacent the rear end thereof, said curved rear end portion having the material thereof removed to form therein an axially extending passage, and a solid reenforcing metal wire member in said passage to hold said curved portion of said temple bar member against straightening out, said metal wire member being bent with said temple bar member and having in its surface a spiral groove.

2. In construction for eyeglass temple bars, in combination, a temple bar member comprising a solid bar of non-metallic material in which is formed an axial passage extending forwardly from the rear end thereof, a rear portion of said bar having said passage therein being bent to a curved contour and having inserted in said passage therein a solid metal reenforcing wire member which is bent therewith, said wire member having in its surface a plurality of longitudinally spaced depressions extending circumferentially about the same.

3. In construction for eyeglass temple bars, in combination, a temple bar member comprising a solid bar of non-metallic material in which is formed an axial passage extending forwardly from the rear end thereof, a rear portion of said bar having said passage therein bent to a curved contour and having inserted in said passage therein a solid metal reenforcing wire member which is bent therewith, said wire member being of a size to fit into said passage snugly and having its surface spirally grooved, the non-metallic material of said bar projecting into said grooves as a result of said bending.

4. In construction for eyeglass temple bars, in combination, a temple bar member comprising a solid bar of non-metallic material having formed therein an axial passage of substantially circular cross-section, and a reenforcing member in said passage comprising a solid metal wire member of polygonal cross-section and spirally twisted and of a diameter to slide snugly into said passage, a rear portion of said temple bar member being bent to a curved contour with said wire therein and the non-metallic material interlocking with said wire member at said curved portion as a result of said bending.

5. In construction for eyeglass temple bars, in combination, a temple bar member comprising a solid bar of non-metallic material having drilled thereinto from the rear end thereof a forwardly extending axial passage, and a metal reenforcing member inserted into said passage from the rear, the rear end of said passage being closed over the rear end of said reenforcing member and a portion of said temple bar member adjacent the rear end thereof being bent to a curved contour with said reenforcing member therein, said reenforcing member comprising a solid metal wire having in its surface a plurality of longitudinal depressions extending circumferentially thereabout, the walls of said passage being interlocked with said depressions at said curved portion as a result of the bending of said temple bar member with said wire reenforcing member therein.

In testimony whereof, I have signed my name to this specification this sixteenth day of July, 1925.

GEORGE E. NERNEY.